(12) United States Patent
Snyder (10) Patent No.: US 11,511,901 B2
(45) Date of Patent: Nov. 29, 2022

(54) CUP SEALING APPARATUS

(71) Applicant: Osgood Industries, LLC, Oldsmar, FL (US)

(72) Inventor: Alan Snyder, New Port Richey, FL (US)

(73) Assignee: OSGOOD INDUSTRIES, LLC, Oldsmar, FL (US)

( * ) Notice: Subject to any disclaimer, the term of this patent is extended or adjusted under 35 U.S.C. 154(b) by 98 days.

(21) Appl. No.: 17/199,144

(22) Filed: Mar. 11, 2021

(65) Prior Publication Data
US 2022/0289418 A1    Sep. 15, 2022

(51) Int. Cl.
B29C 65/18 (2006.01)
B65B 7/28 (2006.01)
B65B 61/18 (2006.01)

(52) U.S. Cl.
CPC .............. B65B 61/18 (2013.01); B29C 65/18 (2013.01)

(58) Field of Classification Search
CPC ... B29C 65/18; B29C 66/122; B29C 66/8161; B29C 66/53461; B29C 66/131; B29C 66/8242; B65B 61/18
See application file for complete search history.

(56) References Cited

U.S. PATENT DOCUMENTS

| | | | |
|---|---|---|---|
| 3,439,587 A | 4/1969 | Sternau | |
| 3,908,340 A | 9/1975 | Erhardt | |
| 4,226,072 A | 10/1980 | Balzer et al. | |
| 4,345,412 A | 8/1982 | Balzer et al. | |
| 4,437,292 A | 3/1984 | Karth | |
| 4,989,393 A | 2/1991 | Sell et al. | |
| 6,251,203 B1* | 6/2001 | Vala | B29C 66/8246 156/580.2 |

(Continued)

FOREIGN PATENT DOCUMENTS

| | | |
|---|---|---|
| DE | 2342582 A1 | 3/1974 |
| JP | S54106393 A | 8/1979 |

OTHER PUBLICATIONS

Extended Search Report issued from the European Patent Office for related Application No. 22161667.5 dated Aug. 5, 2022 (5 Pages).

(Continued)

*Primary Examiner* — Andrew M Tecco
(74) *Attorney, Agent, or Firm* — Michael Best & Friedrich LLP (57) ABSTRACT

A cup sealing apparatus with a shaft, a heating element, an alignment plate, and a spring biasing the alignment plate into engagement with the alignment cone. The shaft extends has an alignment cone at an end thereof, the alignment cone having a modified cone taper surface centered about a longitudinal axis. The heating element includes a heating surface operable to adhere a seal to a cup presented to the heating surface. The alignment plate is spaced from the opposite axial surface, and has a profile corresponding with the taper surface so that the profile and the taper surface form a non-circular interface between the alignment cone and the alignment plate. With deflection of the spring, the alignment plate and the heating element are free to deviate from a prescribed orientation and out of coaxial alignment to match a cup axis of a cup presented to the heating surface.

20 Claims, 7 Drawing Sheets

(56) References Cited

U.S. PATENT DOCUMENTS

| | | | |
|---|---|---|---|
| 6,912,828 B1* | 7/2005 | Yamay | B29C 66/53461 |
| | | | 53/477 |
| 2003/0047287 A1* | 3/2003 | Massey | B29C 66/8163 |
| | | | 156/580 |
| 2017/0197741 A1* | 7/2017 | Carvin | B65B 3/04 |

OTHER PUBLICATIONS

Osgood Industries, "Heat Seal Assembly", product photographs, sold and in public use as of Oct. 2019, (3 Pages).

* cited by examiner

CUP SEALING APPARATUS

BACKGROUND OF THE INVENTION

The present disclosure relates to a cup sealing apparatus for attaching a seal to a cup lip, and more particularly to alignment features for movable portions of such a cup sealing apparatus.

Cup filling and sealing apparatuses are used to fill a cup with a filling substance, often comestibles in liquid or semi-liquid form, and subsequently enclose the filling substance within the cup. Such cups are generally provided with tapered walls with an open end having a lip to which a cap is affixed and sealed with a seal which prevents spilling and contamination of the contents of the comestibles. Heat sealing can be performed on variety of cup materials and geometries to apply the seal to the cup lip. Heat sealing is fast, efficient, and effective at protecting comestibles during transportation and storage. Food producers often incorporate graphic designs onto the cup, which requires the seal to be oriented correctly to the cup.

SUMMARY OF THE INVENTION

The present invention provides, in one aspect, a cup sealing apparatus comprising a shaft having an alignment cone at one end thereof, the alignment cone having a modified cone taper surface centered about a longitudinal axis. The cup sealing apparatus further comprises a heating element including a heating surface and an opposite axial surface. The heating element is operable to adhere a seal to a cup presented to the heating surface. The cup sealing apparatus further comprises an alignment plate fixed to the heating element spaced from the opposite axial surface, the alignment plate having a profile corresponding with the taper of the alignment cone such that the profile and the taper form a non-circular interface between the alignment cone and the alignment plate. The cup sealing apparatus further comprises a spring biasing the profile of the alignment plate into engagement with the modified cone taper surface of the alignment cone, the spring being deflectable to release the alignment plate from the alignment cone. When the alignment plate is biased by the spring into engagement with the alignment cone, the alignment plate and the heating element are coaxially aligned with the longitudinal axis and set in a prescribed rotational orientation. With deflection of the spring, the alignment plate and the heating element are free to deviate from the prescribed rotational orientation and out of coaxial alignment to match a cup axis of the cup presented to the heating surface.

The present invention provides, in another aspect, a cup sealing apparatus comprising a shaft having an alignment cone at one end thereof, the alignment cone having a modified cone taper surface centered about a longitudinal axis. The cup sealing apparatus further comprises a heating element including a heating surface and an opposite axial surface, the heating element operable to adhere a seal to a cup presented to the heating surface. The cup sealing apparatus further comprises an alignment plate fixed to the heating element spaced from the opposite axial surface, the alignment plate having a profile corresponding with the modified cone taper surface of the alignment cone such that the profile and the modified cone taper surface form a non-circular interface between the alignment cone and the alignment plate. The cup sealing apparatus further comprises a spring biasing the profile of the alignment plate into engagement with the modified cone taper surface of the alignment cone, the spring being deflectable to release the alignment plate from the alignment cone. When the alignment plate is biased by the spring into engagement with the alignment cone, the alignment plate and the heating element are coaxially aligned with the longitudinal axis and set in a prescribed rotational orientation. With deflection of the spring, the alignment plate and the heating element are free to deviate from the prescribed rotational orientation and out of coaxial alignment to match a cup axis of the cup presented to the heating surface.

The present invention provides, in another aspect, a cup sealing apparatus comprising a shaft having an alignment cone at one end thereof, the alignment cone having a modified cone taper surface centered about a longitudinal axis. The cup sealing apparatus comprises a heating element including a heating surface and an opposite axial surface. The heating element is operable to adhere a seal to a cup presented to the heating surface. The cup sealing apparatus further comprises an alignment plate fixed to the heating element spaced from the opposite axial surface, the alignment plate having a profile corresponding with the modified cone taper surface of the alignment cone such that the profile and the modified cone taper surface form a non-circular interface between the alignment cone and the alignment plate. The cup sealing apparatus further comprises a spring biasing the profile of the alignment plate into engagement with the modified cone taper surface of the alignment cone, the spring being deflectable to release the alignment plate from the alignment cone. When the alignment plate is biased by the spring into engagement with the alignment cone, the alignment plate and the heating element are coaxially aligned with the longitudinal axis and set in a prescribed rotational orientation. With deflection of the spring, the alignment plate and the heating element are free to deviate from the prescribed rotational orientation and out of coaxial alignment to match a cup axis of the cup presented to the heating surface. At least one of the modified cone taper surface and the profile include parallel lines converging at tangent arcs.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
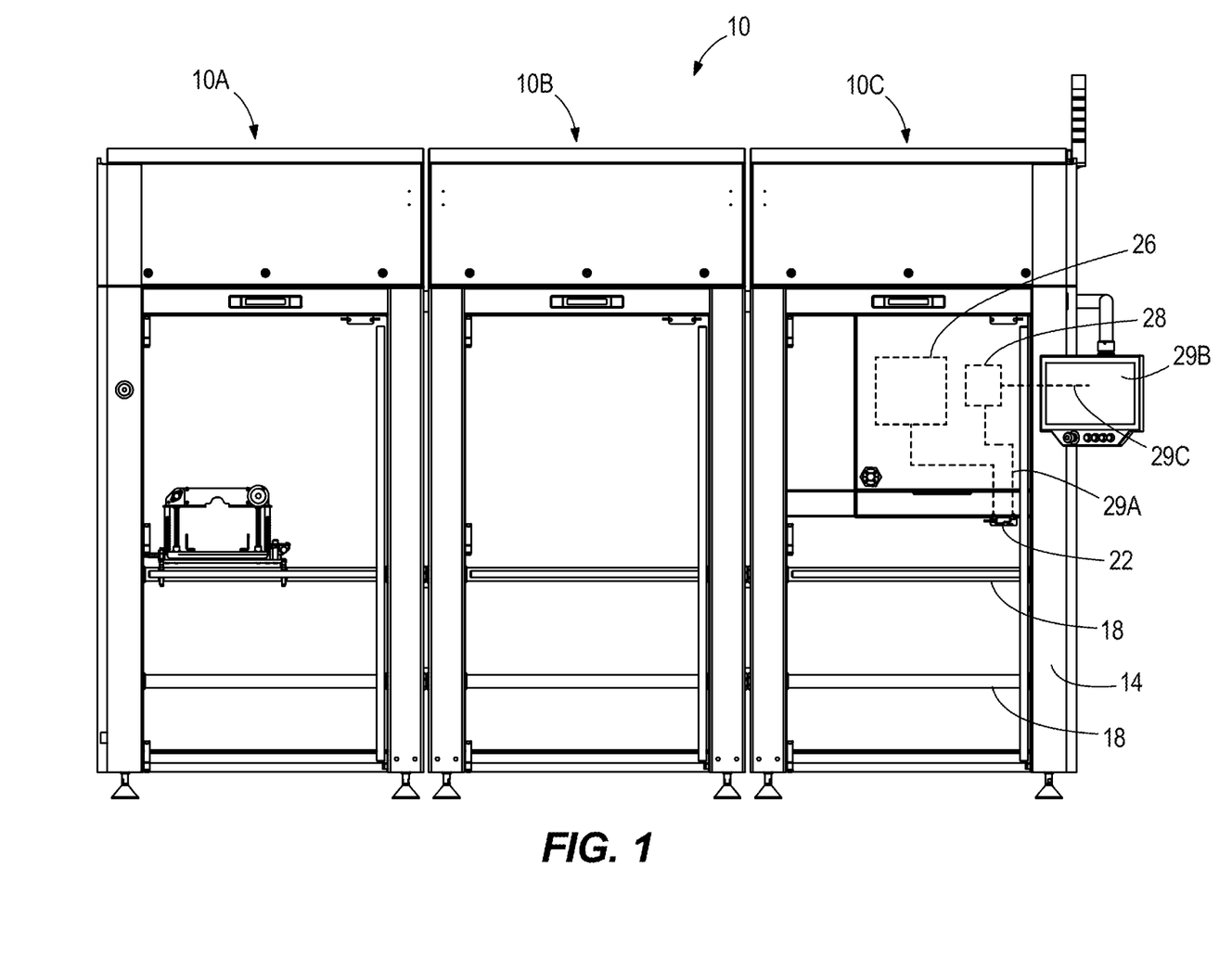
FIG. 1 is a side view of a cup filling and sealing apparatus including a cup sealing apparatus.

FIG. 1 illustrates a cup filling and sealing apparatus 10 which is subdivided into three modules 10A, 10B, and 10C. Each module 10A, 10B, 10C includes a frame 14 further comprising rails 18 which operatively connect the three modules 10A, 10B, 10C together. The rails 18 are further used to support subassemblies. FIG. 1 illustrates the module 10A having a subassembly attached to the rails 18 within the module 10A, and illustrates the module 10C having a cup sealing apparatus 22 attached to the frame 14 within the module 10C. The cup filling and sealing apparatus 10 may include other subassemblies mounted to the rails 18, or a different number of modules. Optionally, the cup filling and sealing apparatus 10 includes a conveyor (not shown) in conjunction with the rails 18 to pass a cup C between each module 10A-10C for each module to successively complete a task associated with filling the cup C and sealing the contents of the cup C from the environment.

Figure 11:
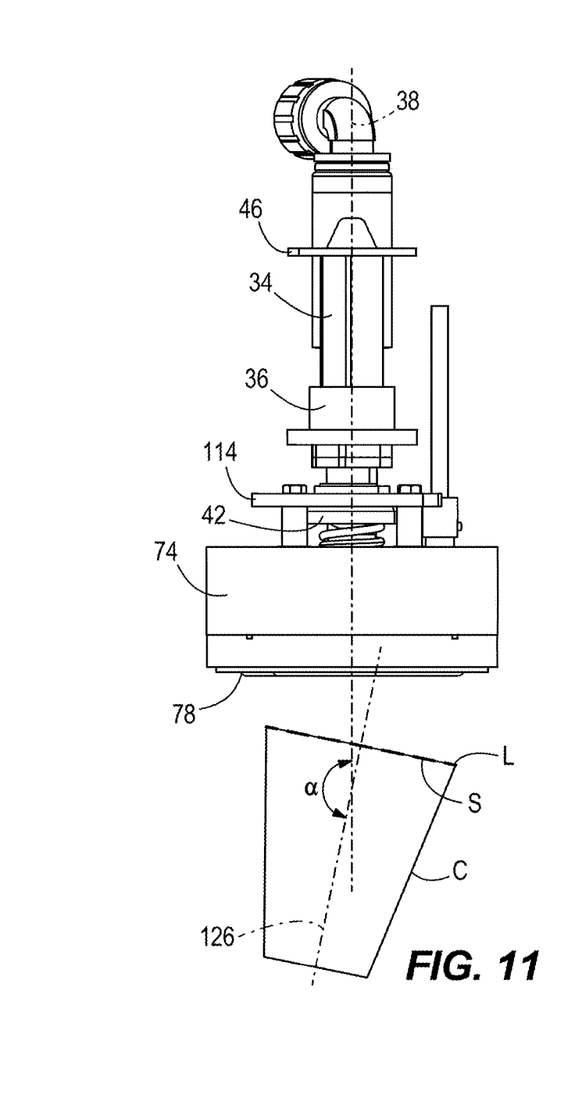
FIG. 11 is a side view of the cup sealing apparatus of FIG. 2 with the heating element in a seated position on the alignment cone.
Figure 12:
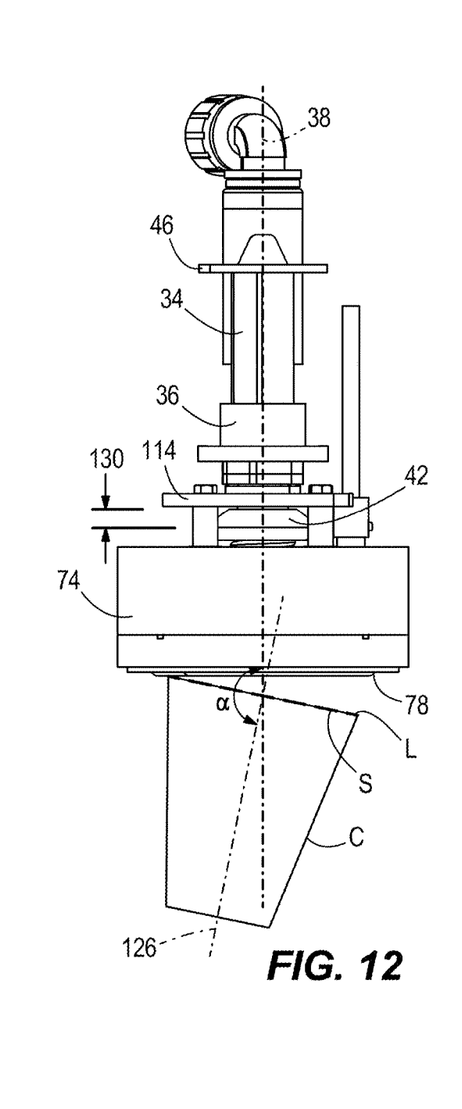
FIG. 12 is a side view of the cup sealing apparatus of FIG. 2 with the heating element in a retracted position displaced from the alignment cone.
Figure 13:
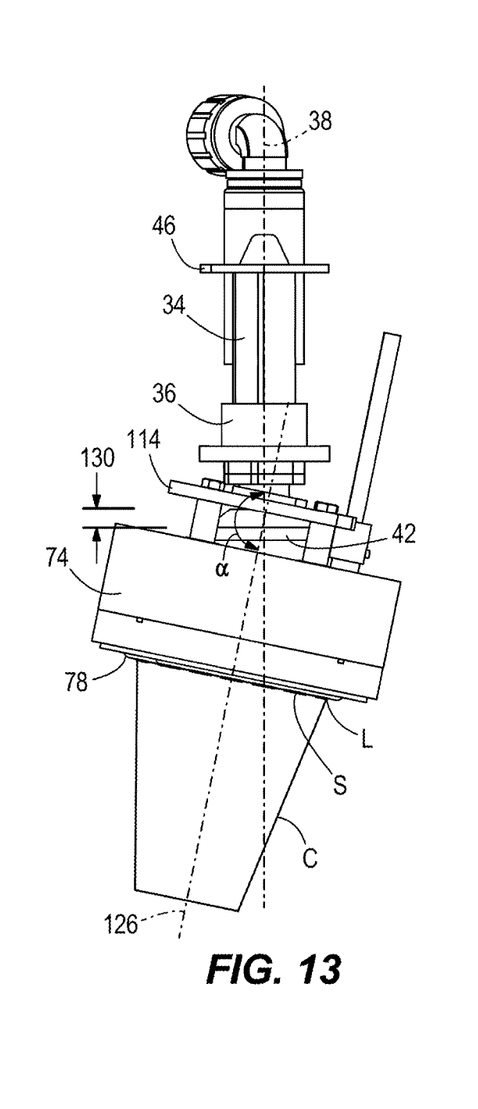
FIG. 13 is a side view of the cup sealing apparatus of FIG. 2 with the heating element in a retracted and tilted position displaced from the alignment cone.

The cup C may be made of, for example, a thermoplastic such as polypropylene or polyethylene. Alternately, the cup material can be coated or uncoated paper, and the cup C may be compostable. In some constructions, the cup C is partially or entirely constructed from recycled materials. The cup C may be filled with a comestible. The comestible can be in liquid or semi-liquid form. For example, the comestible may be orange juice, tomato juice, milk, ice cream, soft drinks, gelatin type desserts, salads, and other types of food. The cups C are provided with tapered (e.g., truncated cone) walls having an enlarged upper open end having a thickened or rolled lip L. The cup C may be shaped in a number of ways, one of which is shown in the example of FIGS. 11-13. Common shapes for cups C include square or rectangular cups C with single or multiple cavities. The cups C may be round cups that vary in diameter, height, and taper. Oval cups C and cups that are joined together to form multiple individual containers separated by the end user for single use are also conceived. In some instances, and especially when the cups C are asymmetric, there may be a need for consistent orientation of the cup C during processing in the cup filling and sealing apparatus 10. A cover S (sometimes referred to as a "seal") that closes the open end of the cup C may be applied to the lip L. As such, the cup C is closed and sealed by the cover S to prevent spilling and contamination of the comestibles or other contents within the cup C. The cover S can be made from, for example, foil, plastic, or an organic film, and/or a coated paper or plastic.

FIGS. 2-6 illustrate the cup sealing apparatus 22 in detail. The cup sealing apparatus 22 functions with a mechanical actuator 26 (FIG. 1) also within the module 10C. The cup sealing apparatus 22, in conjunction with the mechanical actuator 26 and an electrical actuator 28, is operable to apply pressure and heat to bond the cover S on the lip L, either with or without an interstitial bond material. The mechanical actuator 26 may include, for example, a pneumatic cylinder. As will be discussed in detail below, the electrical actuator 28 may include, for example, a controller operable to send electrical current to an electrical resistance heater.

The mechanical actuator 26 is operable to move the cup sealing apparatus 22 relative to the frame 14. A spring 30 is provided with the cup sealing apparatus 22 to bias the cup sealing apparatus 22 against the force of the mechanical actuator 26. As such, when the mechanical actuator 26 does not apply a force to the cup sealing apparatus 22, the spring 30 biases the cup sealing apparatus 22 away from the cup C. The spring 30 is aligned with a shaft 34 that extends along a longitudinal axis 38 of the cup sealing apparatus 22. The spring 30 extends from a first end in contact with a bushing 36 on the shaft 34 and a second end in contact with a shaft cap 46 of the shaft 34. The shaft cap 46 is fixedly retained at an end of the shaft 34. The spring 30 serves a dual purpose. First, the spring 30 applies pressure to the top of the bushing 36 to keep the shaft 34 engaged within the mechanical actuator 26. Second, the spring 30 allows the shaft 34 to retract in the event that a sensor detects that the cup C is missing or the cup C does not have the cover S placed thereon, or the cover S is not ready for sealing. In this second functionality, the spring 30 allows the shaft 34 to move through the bushing 36 when the mechanical actuator 26 that is normally engaged with the end cap 46 is actuated to a retracted position.

Figure 2:
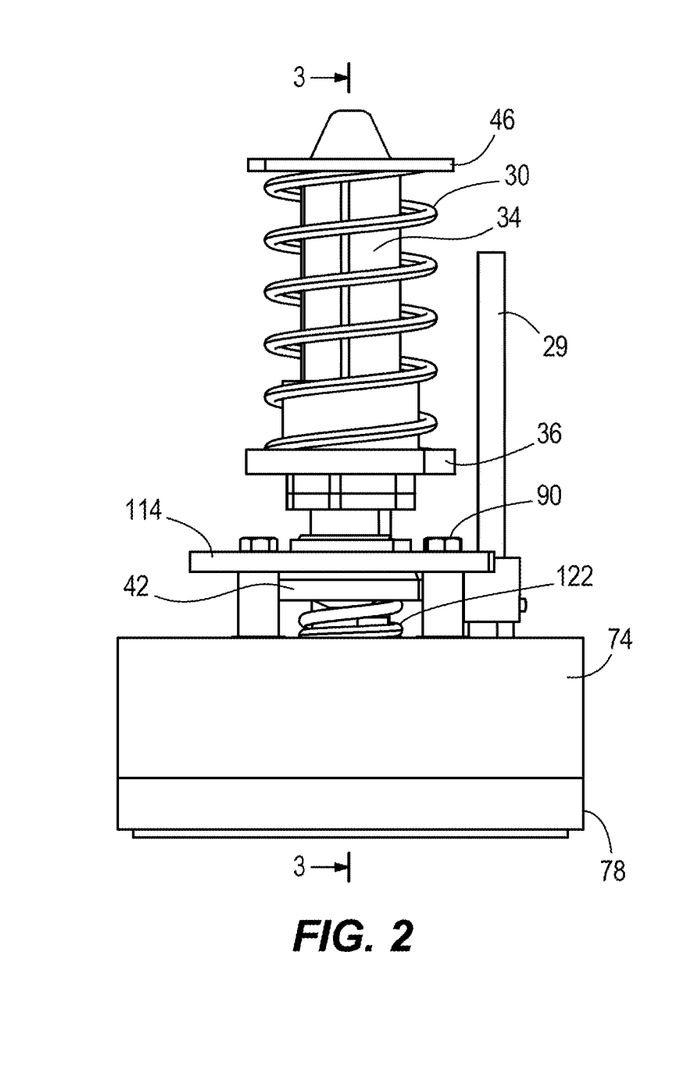
FIG. 2 is a side view of the cup sealing apparatus.
Figure 3:
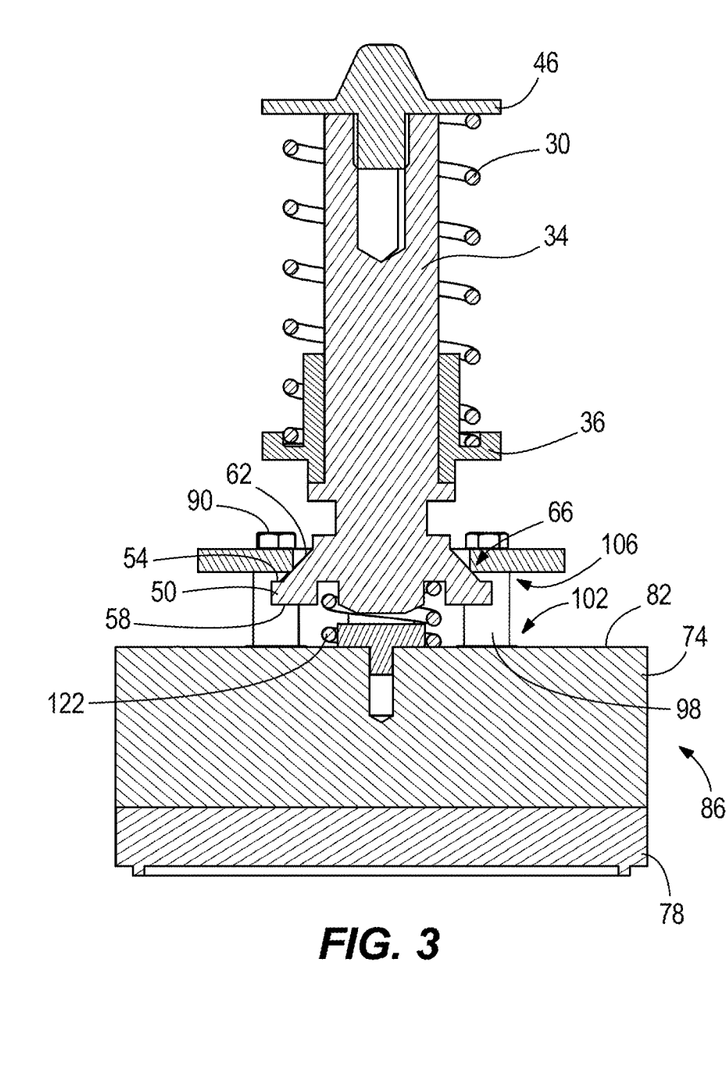
FIG. 3 is a cross-sectional view of the cup sealing apparatus of FIG. 2 taken along section line 3-3.
Figure 4:
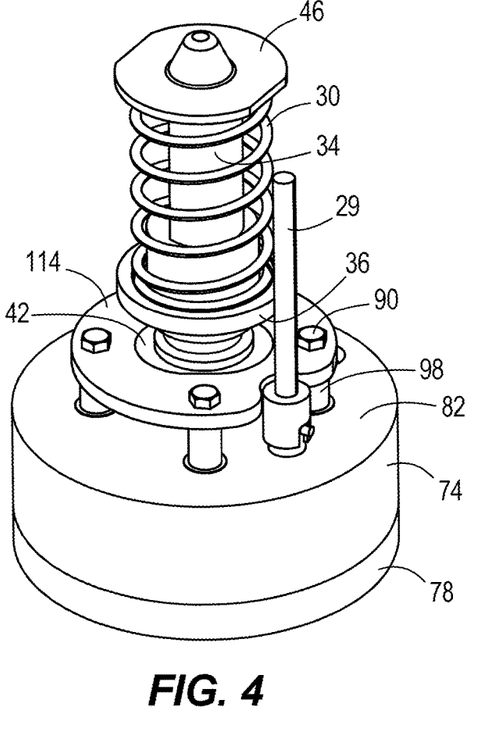
FIG. 4 is a perspective view of the cup sealing apparatus of FIG. 2.
Figure 7:
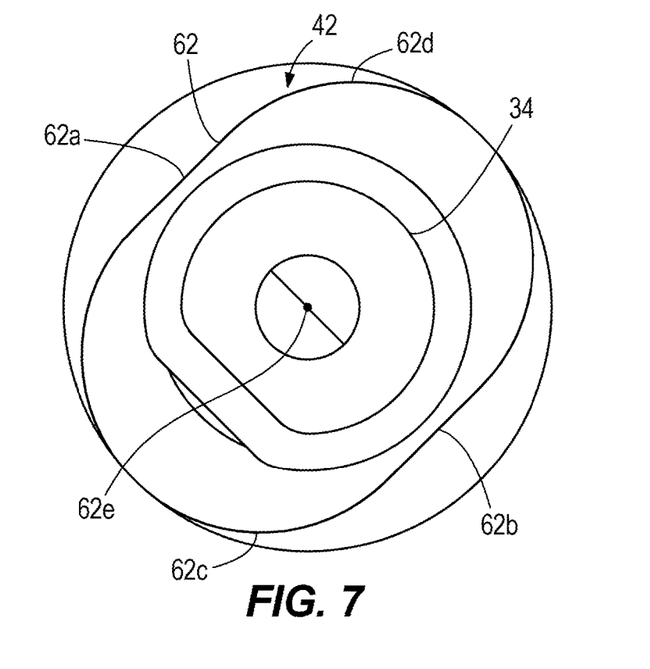
FIG. 7 is a top view of a shaft of the cup sealing apparatus having an alignment cone.
Figure 9:
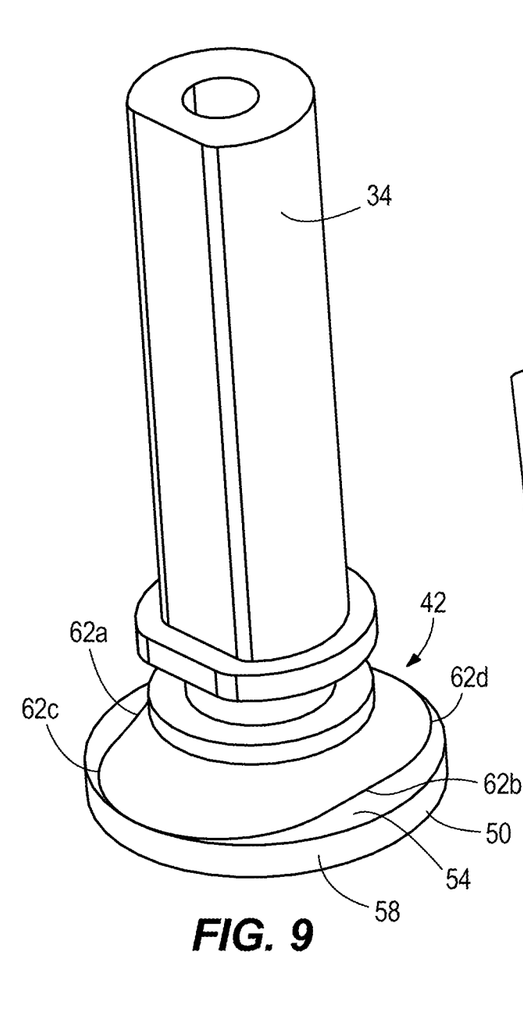
FIG. 9 is a perspective view of the shaft having the alignment cone of FIG. 7.

As discussed, it may be required in at least some applications to have consistent orientation of the cup C during the processing in the cup filling and sealing apparatus 10. Of importance in this disclosure is an interface between the cup C and the cup sealing apparatus 22. To aid in the alignment of the cup C, opposite the shaft cap 46, a bottom end of the shaft 34 includes an alignment cone 42. In the illustrated embodiment, the alignment cone 42 is a modified cone having a non-frustoconical shape. The alignment cone 42, which is best illustrated in FIG. 3, includes a planar portion 50 arranged substantially perpendicular to the longitudinal axis 38 and having a planar first surface 54 (i.e., a top facing upward) and an opposite planar second surface 58 (i.e., a bottom facing downward). The alignment cone 42 includes a tapered surface, referred to hereinafter as the taper 62, extending from the planar first surface 54 along the longitudinal axis 38 upward towards the shaft cap 46. The taper 62 is a modified cone taper surface. In other words, the taper 62 does not have a perfectly conical shape with circular profiles at each cross-section. As best illustrated in FIG. 2, the taper 62 extends from a radially outer portion of the planer first surface 54 converging towards the center of the shaft 34 along the longitudinal axis 38. In the illustrated embodiment, the taper 62 is a linear taper, with the taper 62 converging towards the longitudinal axis 38 linearly. Other such curvilinear tapers are possible. As best illustrated in FIGS. 7 and 9, in an axial view along the longitudinal axis 38, the taper 62 includes two parallel lines 62a, 62b, converging at two tangent arcs 62c, 62d. As such, the taper 62 is non-circular as viewed along the longitudinal axis 38 and in corresponding cross-section view. Rather, the taper 62 in the illustrated embodiment is an oblong shape. The taper 62 may be otherwise shaped. The opposite planar second surface 58 includes a receptacle 70 configured to receive an alignment spring 122 which is described in detail below.

The cup sealing apparatus 22 applies heat to the cup C through a heating element 74. The heating element 74 is in electrical communication with the electrical actuator 28 such that the heating element 74 is operable to receive electrical current, and convert the current to heat for sealing the cover S to the cup C. Wires 29A connect the heating element 74 to the electrical actuator 28. The heating element 74 may be, for example, an electrical resistance heater. Other types of heating elements 74 are possible. The electrical actuator 28 may be in communication with a control module 29B through wires 29C to send and receive signals relating to the cup sealing apparatus 22 and other subassemblies in connection with the cup filling and sealing apparatus 10.

Figure 5:
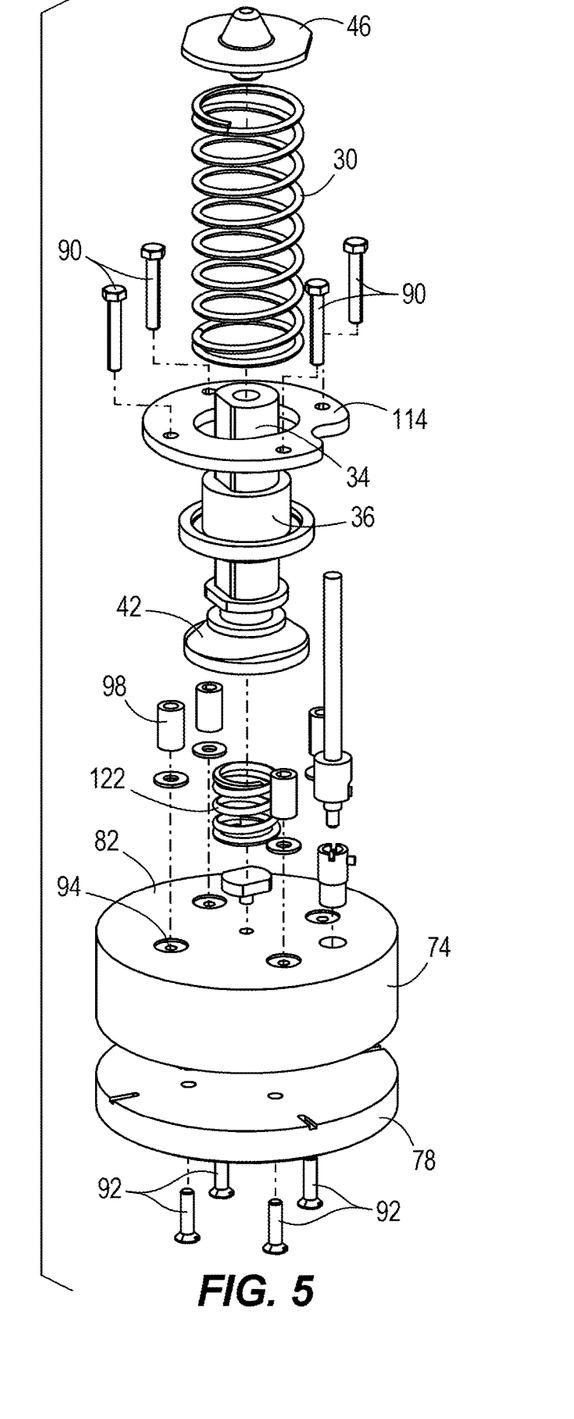
FIG. 5 is an exploded view of the cup sealing apparatus of FIG. 2.
Figure 6:
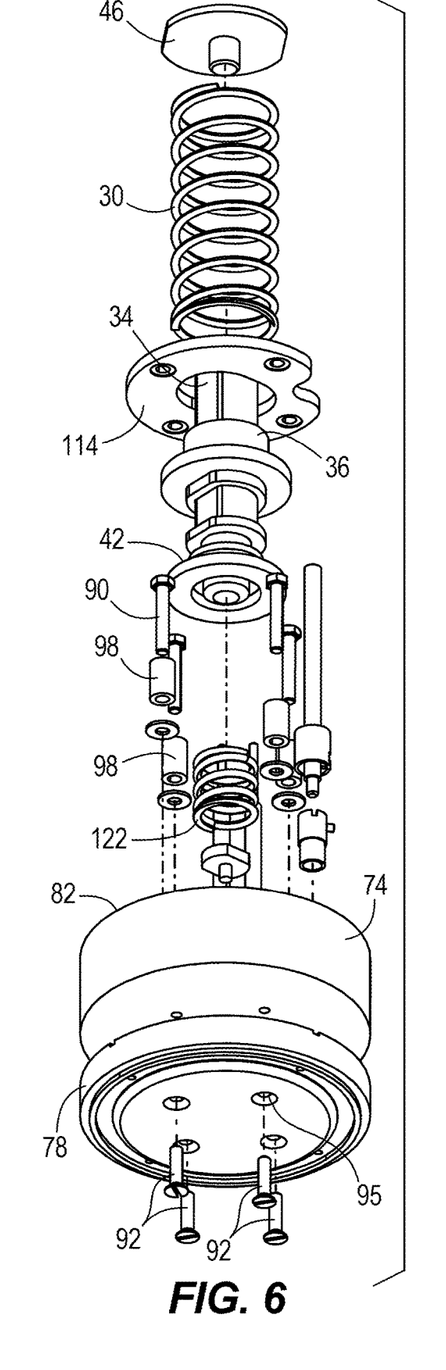
FIG. 6 is another exploded view of the cup sealing apparatus of FIG. 2.

The heating element 74 has a heating surface 78 and an opposite axial surface 82 spaced from the heating surface 78. The heating surface 78 is a bottom surface, while the surface 82 is a top surface—the orientation following from the cup C being presented with the opening facing upward away from the ground to retain the contents. Optionally, the heating element 74 including the heating surface 78 and the opposite axial surface 82 may be formed within a housing 86. As illustrated in FIGS. 5 and 6, a fastener 90 is configured to fix the heating element 74 to an alignment plate 114, thus forming a floating heating head assembly that is movable with respect to the shaft 34. In the illustrated embodiment, the fastener 90 is a screw. In the illustrated embodiment, three fasteners 90 fix the heating element 74 to the alignment plate. The three fasteners 90 are evenly spaced circumferentially around the alignment plate 114 to promote even loading between the fasters 90 and the alignment plate 114. A fastener 92 is configured to fix the heating surface 78 to the heating element 74 in the illustrated embodiment. Other heating elements 74 may have heating surfaces 78 which are integral with the heating element 74. In the illustrated embodiment, the fastener 92 is a screw. In the illustrated embodiment, four fasteners 92 fix the heating surface 78 to the heating element 74. The four fasteners 92 are evenly spaced circumferentially around the heating element 74 and heating surface 78 to promote even loading between the fasteners 92 and the heating element 74. In the illustrated embodiment (FIG. 5), the heating element 74 and the opposite axial surface 82 each include a hole 94 configured to receive each individual fastener 90 therethrough. The fastener 90 further engages a spacer 98. A first end 102 of the spacer 98 is located adjacent the surface 82, and a second end 106 of the spacer 98 is located adjacent the alignment plate 114 such that the spacer 98 acts to set an axial spacing therebetween. In the illustrated embodiment (FIGS. 6, 10), the heating element 74 and the heating surface 78 each include a hole 95 configured to receive each individual fastener 92 therethrough.

In operation of the cup sealing apparatus 22, a cover S is applied to the cup C, and the cup C is located below the shaft 34. The cup C is brought into contact with the heating surface 78. With the shaft 34 in a fixed position, the alignment plate 114 is displaced from the alignment cone 42 upon the cup C contacting the heating surface 78. In the event that the cup C, and more specifically, the lip L is not perpendicular with the longitudinal axis 38, the heating surface 78 is configured to "float" relative to the alignment cone 42, allowing it to be displaced and optionally assume a different angle. Heat is then applied through the heating element 74 and heating surface 78 to bond the cover S to the cup C. After heat is applied, the cup C is separated from the heating surface 78 by moving either the cup C or the shaft 34. As the cup C is separated, the alignment plate 114 is retracted towards the alignment cone 42 at least partially along the longitudinal axis 38 by the bias of the spring 122. The alignment plate 114 contacts the alignment cone 42 to realign the alignment plate 114 in a reset position for subsequent use.

Figure 8:
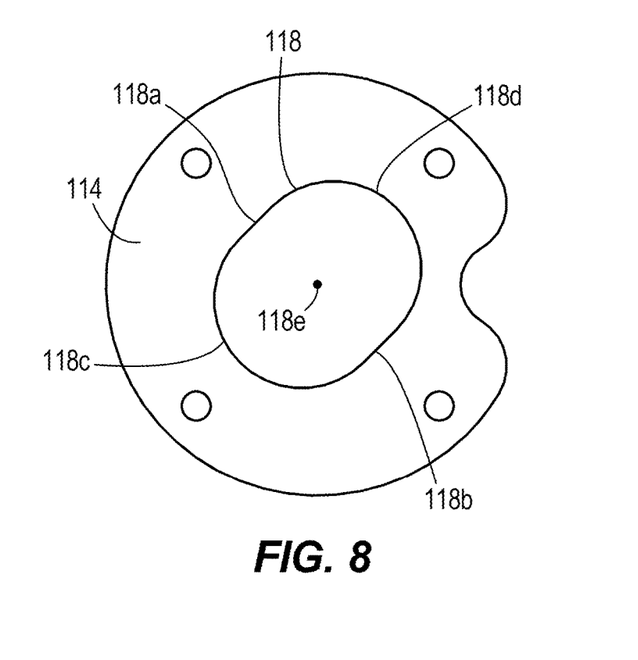
FIG. 8 is a top view of an alignment plate of the cup sealing apparatus.

As illustrated in FIG. 8, the alignment plate 114 comprises a profile 118, as viewed perpendicular to the longitudinal axis 38 or in a like cross-section, that includes two parallel lines 118a, 118b converging at two tangent arcs 118c, 118d. Thus, the profile 118 is non-circular and has a prescribed rotational orientation about the axis 38. The profile 118 and the taper 62 are correspondingly shaped such that, upon retraction of the alignment plate 114 towards the alignment cone 42 along the longitudinal axis 38, the taper 62 aligns the profile 118 with the longitudinal axis 38. Once aligned along the longitudinal axis 38, a profile center 62e, 118e of both the taper 62 and the profile 118 is positioned concentrically with the longitudinal axis 38. Axial motion of the alignment plate 114 along the taper 62 and the longitudinal axis 38 is then permitted to seat the alignment plate 114 within the alignment cone 42. Thus, the alignment plate 114 and heating element 74 are reset with the profile center 118e, and thus the heating element 74 concentric with the longitudinal axis 38. In some constructions, the profile 118 and/or the taper 62 can have other modified, non-circular cone shapes that create a prescribed coaxial and rotationally aligned orientation.

Figure 10:
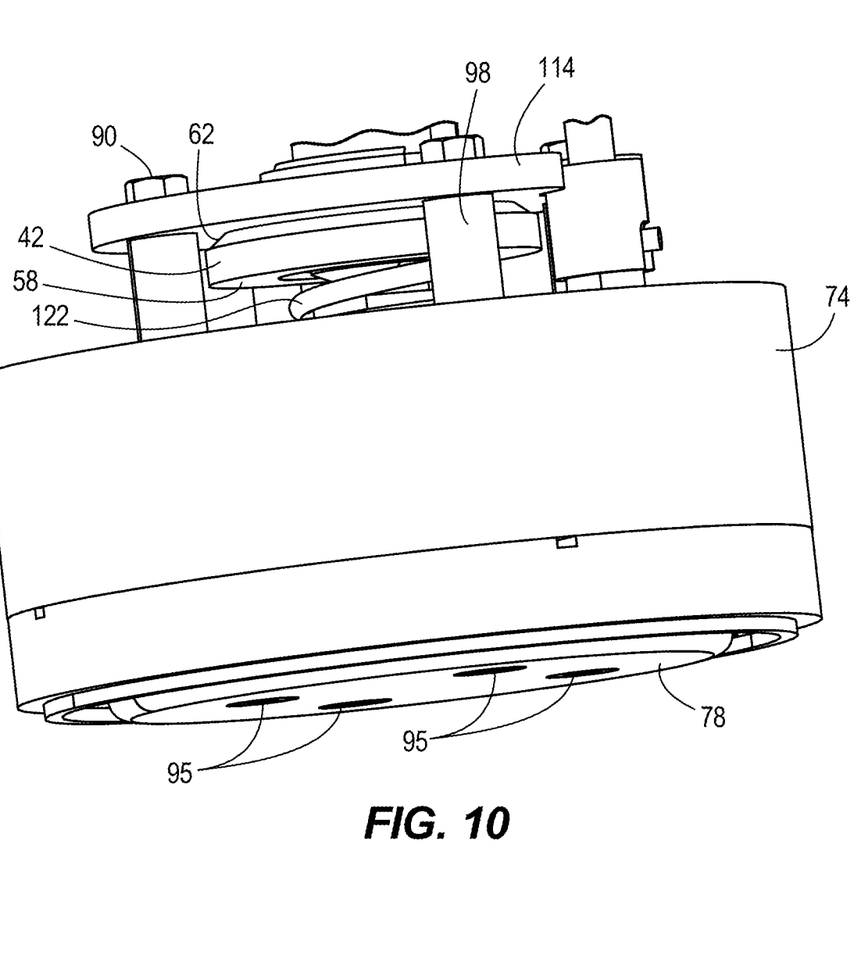
FIG. 10 is a bottom perspective view of the cup sealing apparatus of FIG. 2, including a heating element.

As previously discussed and illustrated in FIG. 10, the cup sealing apparatus 22 further includes an alignment spring 122 biasing the heating element 74 and alignment plate 114 against the alignment cone 42, e.g., by applying an axial and upward bias force to the bottom of the shaft 34. The alignment spring 122 is biased to retain the alignment plate 114 against the alignment cone 42. As such, with deflection of the spring 122, the alignment plate 114 and heating element 74 are free to deviate from the prescribed rotational orientation and out of coaxial alignment to match the cup axis 126 of the cup C. Thus, when a cup C having a lip L aligned along a cup axis 126 which is non-parallel with the longitudinal axis 38, the alignment plate 114 and heating element 74 are operable to be aligned about the cup axis 126 while the alignment cone 42 retains alignment about the longitudinal axis 38. In this misaligned position, and as best shown in FIG. 13, the alignment plate 114 is disposed from (i.e., retracted from and angled relative to) the alignment cone 42. Once the heating element 74 is separated from the cup C, the alignment plate 114 and heating element 74 are biased by the alignment spring 122 to return the alignment plate 114 and the heating element 74 to the reset position aligned with the longitudinal axis 38. The alignment spring 122 may be removably connected to the cup sealing apparatus 22 for replacement of the alignment spring 122 with a stiffer or weaker alignment spring 122.

FIGS. 11-13 illustrate an exemplary operation of the cup sealing apparatus 22. As viewed in FIG. 11, the cup C is located vertically below the longitudinal axis 38 of the cup sealing apparatus 22, the cup C having a cup axis 126 at a tilt angle α relative to the longitudinal axis 38. At this time, the cover S is located on the lip L of the cup C, but the cover S is not sealed onto the cup C. FIG. 12 illustrates advancement of the cup sealing apparatus 22 along the longitudinal axis 38 by the mechanical actuator 26 with the heating surface 78 contacting a portion of the lip L. FIG. 12 further illustrates the void 130 defined between the alignment cone 42 and the alignment plate 114, the alignment plate 114 in an intermediate position displaced from the alignment cone 42. FIG. 13 illustrates further advancement of the cup sealing apparatus 22 along the longitudinal axis 38 by the mechanical actuator 26 with the heating surface 78 in contact with the cover S which rests upon the lip L. Further, in the position of FIG. 13, the heating surface 78 and the heating element 74 are aligned with the cup axis 126. Once in the position of FIG. 13, sufficient heat and pressure can be applied by the mechanical actuator 26 to uniformly and completely seal the cover S onto the lip L and close the cup C.

Upon completion of the sealing, the reverse process is enacted. The mechanical actuator 26 retreats the cup sealing apparatus 22 to the positions of FIG. 12, and subsequently, FIG. 11. In the retreat of the cup sealing apparatus 22 between FIGS. 13 and 11, the retraction of the alignment plate 114 into the alignment cone 42 aligns the planar (in plane perpendicular to the longitudinal axis 38) and rotational positioning of the alignment plate 114 with respect to the alignment cone 42. In other words, the alignment plate 114 is moved from a position (FIG. 13) parallel with the cup axis 126 in which the alignment plate 114 is displaced from the alignment cone 42 to a position (FIG. 11) in which the alignment plate 114 is parallel with the longitudinal axis 38. In the retraction of the alignment plate 114, the tilt angle α of the alignment plate 114 is relieved, and the alignment plate 114 is realigned to a position parallel with the longitudinal axis 38. The interface between the taper 32 and the profile 118 is configured to drive the alignment plate 114 and the alignment cone 42 back into coaxial alignment by the bias of the spring 122. Further, the retraction of the alignment plate 114 into the alignment cone 42 permits rotational or radial realignment of the alignment plate 114 relative to the alignment cone 42 in a circumferential direction about the longitudinal axis 38 as the bias in the alignment spring 122 is released. As such, the interface further is configured to drive rotational realignment of the alignment plate 114 relative to the alignment cone 42 by the bias of the spring 122. In the illustrated embodiment, such rotational or radial realignment of the alignment plate 114 limits stress placed on the wires 29. Further, the rotational or radial realignment allows for more consistent contact between the heating element 74 and the cup C. Other reasons for rotational or radial alignment of the alignment plate 114 may include the requirement of the heating surface 78 to be rotationally aligned with ("clocked" with respect to) the lip L. As such, the exemplary operation of the cup sealing apparatus 22 can be repeated even when subsequent cups C have differing cup axes 126.

Figures 14, 15, 16:
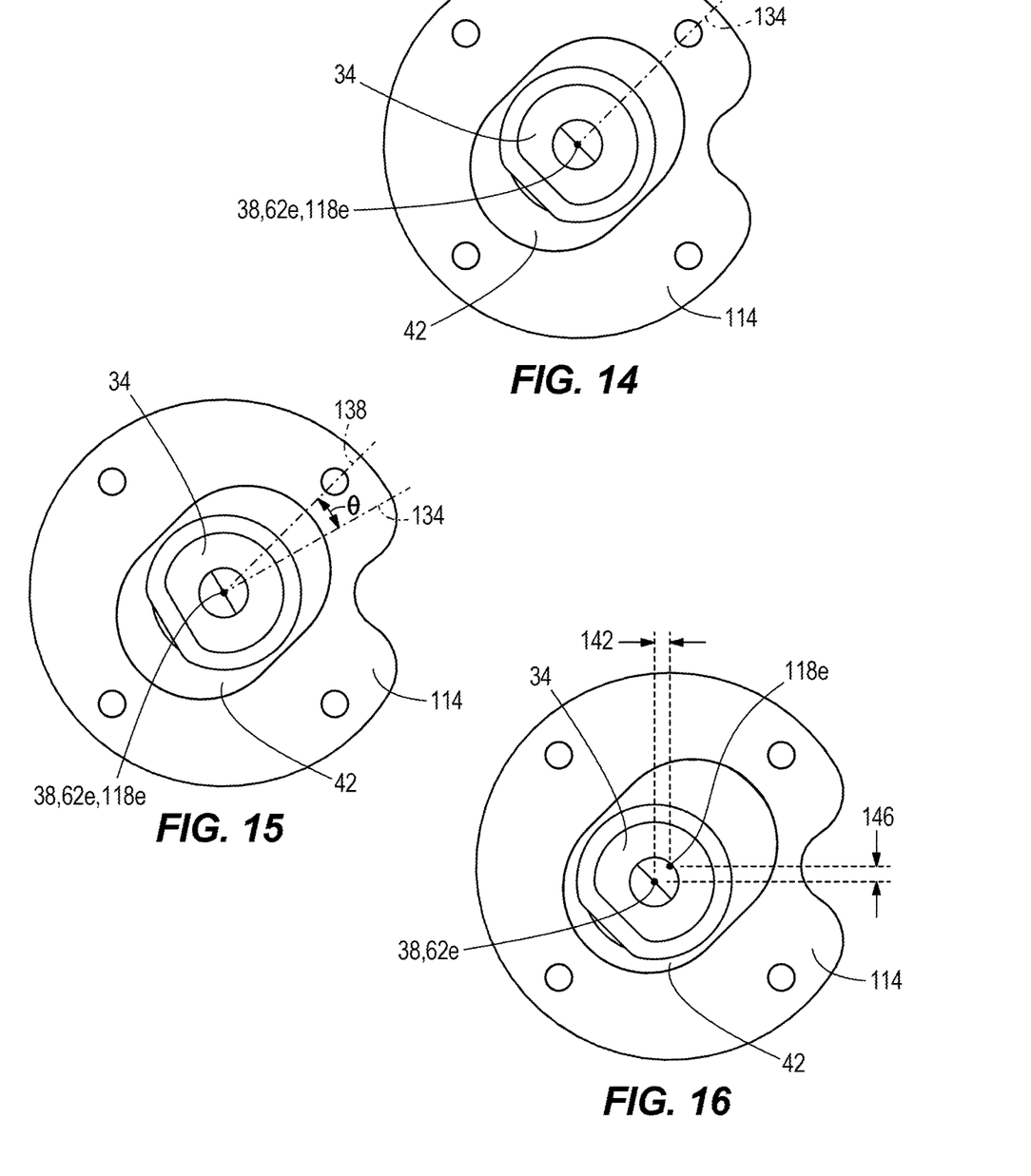
FIG. 14 is a top view of the alignment plate, shaft, and alignment cone, with the alignment plate engaging the alignment cone.
FIG. 15 is a top view of the alignment plate, shaft, and alignment cone, with the alignment plate displaced and rotated out of alignment from the alignment cone.
FIG. 16 is a top view of the alignment plate, shaft, and alignment cone, with the alignment plate displaced and translated out of alignment from the alignment cone.

FIGS. 14-16 further illustrate the exemplary operation of the cup sealing apparatus 22. In FIG. 14, the alignment plate 114 is received within the alignment cone 42 with both the profile center 62e of the taper 62 and the profile center 118e of the profile 118 being coincident with the longitudinal axis 38. A first reference axis 134 is drawn parallel to the parallel lines 118a, 118b defining the profile 118.

FIG. 15 illustrates the alignment plate 114 in a position in which the cup C has caused rotational misalignment of the alignment plate 114 relative to the alignment cone 42. The first reference axis 134 is reproduced on FIG. 15, and a second reference axis 138 is drawn parallel to the parallel lines 118a, 118b defining the profile 118 when the alignment plate is rotationally misaligned. An angle Θ is located between the first reference axis 134 and the second reference axis 138, the angle Θ representing the amount of rotational misalignment of the alignment plate 114 from the alignment cone 42. The first reference axis 134 generally defines the prescribed rotational orientation of the alignment plate 114. Once the alignment plate 114 is forced into engagement with the alignment cone 42 by the spring 122, the angle Θ is zeroed, and the alignment plate 114 returns to the position shown in FIG. 14.

FIG. 16 illustrates the alignment plate 114 in a position in which the cup C has caused translational misalignment of the alignment plate 114 relative to the alignment cone 42. In the illustrated embodiment, the profile center 118e of the profile 118 is misaligned from the profile center 62e of the taper 62 by both a first translational misalignment 142 and a second translational misalignment 146. Both the first translational misalignment 142 and the second translational misalignment 146 are in a plane perpendicular to the longitudinal axis 38. Once the alignment plate 114 is forced into engagement with the alignment cone 42 by the spring 122, both the first translational misalignment and the second translational misalignment 146 are relieved, and the alignment plate 114 returns to the position shown in FIG. 14. Further, it is possible that the cup C causes some amount of rotational misalignment (by the angle Θ) and simultaneous translational misalignment (by one or both of the first and second translational misalignments 142, 146). In such a case, the alignment plate 114 returns to the position shown in FIG. 14 upon forced engagement with the alignment cone 42 by the spring 122.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Various features of the invention are set forth in the following claims.

What is claimed is:

1. A cup sealing apparatus comprising:
a shaft having an alignment cone at one end thereof, the alignment cone having a modified cone taper surface centered about a longitudinal axis, the modified cone taper surface having an oblong shape as viewed along the longitudinal axis;
a heating element including a heating surface and an opposite axial surface, the heating element operable to adhere a seal to a cup presented to the heating surface;
an alignment plate fixed to the heating element spaced from the opposite axial surface, the alignment plate having a profile corresponding with the modified cone taper surface of the alignment cone such that the profile and the modified cone taper surface form a non-circular interface between the alignment cone and the alignment plate; and
a spring biasing the profile of the alignment plate into engagement with the modified cone taper surface of the alignment cone, the spring being deflectable to release the alignment plate from the alignment cone,
wherein when the alignment plate is biased by the spring into engagement with the alignment cone, the alignment plate and the heating element are coaxially aligned with the longitudinal axis and set in a prescribed rotational orientation, and wherein, with deflection of the spring, the alignment plate and the heating element are free to deviate from the prescribed rotational orientation and out of coaxial alignment to match a cup axis of the cup presented to the heating surface.

2. The cup sealing apparatus of claim 1, wherein the interface between the modified cone taper surface of the alignment cone and the profile of the alignment plate is configured to drive the alignment plate and the alignment cone back into coaxial alignment by the bias of the spring.

3. The cup sealing apparatus of claim 2, wherein the interface further is configured to drive rotational realignment of the alignment plate relative to the alignment cone by the bias of the spring.

4. The cup sealing apparatus of claim 1, wherein at least one of the modified cone taper surface and the profile include parallel lines converging at tangent arcs.

5. The cup sealing apparatus of claim 1, wherein when the alignment plate is biased into engagement with the alignment cone, at least one of the modified cone taper surface and the profile includes a profile center located on a central longitudinal axis of the cup sealing apparatus.

6. The cup sealing apparatus of claim 1, further comprising a fastener and a spacer which operatively connect the alignment plate to the heating element with the spacer between the alignment plate and the opposite axial surface of the heating element.

7. The cup sealing apparatus of claim 1, further comprising a mechanical actuator configured to apply pressure between the heating element and the cup.

8. A cup sealing apparatus comprising:
a shaft having an alignment cone at one end thereof, the alignment cone having a modified cone taper surface centered about a central longitudinal axis of the cup sealing apparatus;
a heating element including a heating surface and an opposite axial surface, the heating element operable to adhere a seal to a cup presented to the heating surface;
an alignment plate fixed to the heating element spaced from the opposite axial surface, the alignment plate having a profile corresponding with the modified cone taper surface such that the profile and the modified cone taper surface form a non-circular interface between the alignment cone and the alignment plate; and
a spring biasing the profile of the alignment plate into engagement with the modified cone taper surface of the alignment cone, the spring being deflectable to release the alignment plate from the alignment cone,
wherein when the alignment plate is biased by the spring into engagement with the alignment cone, the alignment plate and the heating element are coaxially aligned with the central longitudinal axis with a center of the profile being located on the central longitudinal axis and set in a prescribed rotational orientation, and
wherein, with deflection of the spring, the alignment plate and the heating element are free to deviate from the prescribed rotational orientation and out of coaxial alignment to match a cup axis of the cup presented to the heating surface.

9. The cup sealing apparatus of claim 8, wherein the interface between the modified cone taper surface of the alignment cone and the profile of the alignment plate permits translational realignment of the alignment plate relative to the alignment cone in a plane perpendicular to the central longitudinal axis when the spring bias is released.

10. The cup sealing apparatus of claim 9, wherein the interface further permits rotational realignment of the alignment plate relative to the alignment cone in the plane perpendicular to the central longitudinal axis when the spring bias is released.

11. The cup sealing apparatus of claim 8, wherein at least one of the modified cone taper surface and the profile includes parallel lines converging at tangent arcs.

12. The cup sealing apparatus of claim 8, further comprising a fastener and a spacer which operatively connect the alignment plate to the heating element with the spacer between the alignment plate and the opposite axial surface of the heating element.

13. The cup sealing apparatus of claim 8, further comprising a mechanical actuator configured to apply pressure between the heating element and the cup.

14. A cup sealing apparatus comprising:
a mechanical actuator;
a shaft having an alignment cone at one end thereof, the alignment cone having a modified cone taper surface centered about a longitudinal axis;
a heating element including a heating surface and an opposite axial surface, the heating element operable to adhere a seal to a cup presented to the heating surface;
an alignment plate fixed to the heating element spaced from the opposite axial surface, the alignment plate having a profile corresponding with the modified cone taper surface of the alignment cone such that the profile and the modified cone taper surface form a non-circular interface between the alignment cone and the alignment plate; and
a spring biasing the profile of the alignment plate into engagement with the modified cone taper surface of the alignment cone, the spring being deflectable to release the alignment plate from the alignment cone,
wherein when the alignment plate is biased by the spring into engagement with the alignment cone, the alignment plate and the heating element are coaxially aligned with the longitudinal axis and set in a prescribed rotational orientation,
wherein, with deflection of the spring, the alignment plate and the heating element are free to deviate from the prescribed rotational orientation and out of coaxial alignment to match a cup axis of the cup presented to the heating surface, and wherein at least one of the modified cone taper surface and the profile includes parallel lines converging at tangent arcs.

15. The cup sealing apparatus of claim 14, wherein the interface between the modified cone taper surface of the alignment cone and the profile of the alignment plate permits translation realignment of the alignment plate relative to the alignment cone in a plane perpendicular to the longitudinal axis when the spring bias is released.

16. The cup sealing apparatus of claim 14, wherein the interface between the modified cone taper surface of the alignment cone and the profile of the alignment plate permits rotational realignment of the alignment plate relative to the alignment cone in a plane perpendicular to the longitudinal axis when the spring bias is released.

17. The cup sealing apparatus of claim 14, wherein when the alignment plate is biased into engagement with the alignment cone, at least one of the modified cone taper surface and the profile includes a profile center located on the longitudinal axis.

18. The cup sealing apparatus of claim 14, further comprising a fastener and a spacer which operatively connect the alignment plate to the heating element with the spacer between the alignment plate and the opposite axial surface of the heating element.

19. The cup sealing apparatus of claim 14, further comprising a mechanical actuator configured to apply pressure between the heating element and the cup.

20. The cup sealing apparatus of claim 14, wherein the alignment cone further comprises a planar surface, and wherein the modified cone taper surface extends from the planar surface to converge toward the longitudinal axis.

* * * * *